United States Patent

Barassi et al.

[15] 3,690,364
[45] Sept. 12, 1972

[54] RADIAL TIRE HAVING BREAKER STRUCTURE

[72] Inventors: Carlo Barassi; Giuseppe Lugli; Mario Mezzanotte; Romano Guermandi, all of Milan, Italy

[73] Assignee: Industrie Pirelli S.p.A., Milan, Italy

[22] Filed: April 30, 1971

[21] Appl. No.: 138,895

[30] Foreign Application Priority Data

May 5, 1970 Italy.....................24174 A/70

[52] U.S. Cl................................................152/361
[51] Int. Cl................................................B60c 9/18
[58] Field of Search......................................152/361

[56] References Cited

FOREIGN PATENTS OR APPLICATIONS 862,522  2/1971  Canada....................152/361

Primary Examiner—Gerald M. Forlenza
Assistant Examiner—George H. Libman
Attorney—Stevens, Davis, Miller & Mosher

[57] ABSTRACT

The invention relates to improvements in the breaker structure for radial type pneumatic tires. The structure according to the invention comprises at least two superposed strips of textile material having at least one strip of metallic material interposed therebetween and an additional metallic or equivalent strip arranged radially outermost of the aforementioned strips. The improvement in the present invention resides in the fact that at least one of the textile strips is folded so as to provide a fold line along each edge of the structure.

8 Claims, 4 Drawing Figures

INVENTORS
CARLO BARASSI
GIUSEPPE LUGLI
MARIO MEZZANOTTE
ROMANO GUERMANDI

BY Stevens, Davis, Miller & Mosher
ATTORNEYS

PATENTED SEP 12 1972 3,690,364

INVENTORS
CARLO BARASSI
GIUSEPPE LUGLI
MARIO MEZZANOTTE
ROMANO GUERMANDI
BY *Stevens, Davis, Miller & Mosher*
ATTORNEYS

RADIAL TIRE HAVING BREAKER STRUCTURE

This application relates to improvements relative to the invention disclosed in U.S. Pat. application Ser. No. 73,112 filed Sept. 17, 1970.

The aforementioned application concerns "radial" tires, namely tires provided with a carcass formed by cords lying in radial planes or forming small angles with said planes; more precisely it relates to the breaker structures of radial tires, namely to those relatively stiff annular structures which are inserted between the tread and the carcass. According according to the prior application, the breaker structure comprises the following elements:

a. at least two superimposed strips of textile material, whose cords are inclined, with respect to the mid-circumferential plane, at an angle ranging between 10° and 30°;

b. at least a strip made of metal, or of another material having a high modulus of elasticity, inserted between said textile strips, the cords of said metal strip being inclined in opposite direction at an angle ranging between 13° and 33°, and said angle being greater by at least 2° than the angle formed by the cords of the textile strips;

c. an additional strip of metallic material or of another compression-resistant material, arranged in radially outer position and having its cords inclined at an angle ranging between 60° and 90° with respect to the mid-circumferential plane.

A breaker structure having this configuration is particularly suitable for tires intended to be used on very fast cars, since it confers to such tires high characteristics of road holding and driving safety, without anyhow affecting their comfort.

Moreover, the presence of the metallic additional strip, arranged in radially outer positions, constitutes a solid support for the tread blocks, which are therefore stiffer and less flexible when they are in contact with the ground.

This tendency of the blocks to remain in their original molding position contributes in a relevant manner to eliminate their creeping on the ground, and therefore to reduce localized irregular wear of the tread; moreover, it improves considerably the road holding of the tire on wet ground, since water discharge from the grooves of the tread is facilitated.

The present additional application aims at specifying further embodiments of the object of said prior application, by means of which, besides ensuring the above advantages, considerable improvements are obtained as regards tire life.

These embodiments are therefore particularly suitable in those cases in which the main problem is a long tire mileage.

The object of the present application is accordingly a pneumatic tire for vehicle wheels, which comprises a radial carcass and a breaker structure formed by strips of cord fabric of textile material and by strips of cord fabric of metallic material or of another compression-resistant material, the cords of such strips being inclined with respect to the mid-circumferential plane, said breaker structure comprising at least two superimposed strips of textile material whose cords are inclined at an angle ranging between 10° and 30° in one direction with respect to the mid-circumferential plane, at least one strip of metallic material or of another material having a high modulus of elasticity, inserted between said textile trips, whose cords are inclined in an opposite direction at an angle ranging between 13° and 33°, said angle being greater by at least 2° than the angle formed by the cords of said textile strips, an additional strip of metallic material or of another compression-resistant material arranged in a radially outer position, whose cords form with the mid-circumferential plane an angle ranging between 60° and 90°, the foregoing being in accordance with said prior application and the improvement being in that at least one of the strips of textile material is folded in such a way that at least one folding line is present at each of the lateral edges of the breaker structure.

In the present application the width of the breaker structure is defined by the distance between the folding lines of the strips, said folding lines constituting therefore the lateral edges of the breaker, said width, in the tires according to the invention, being substantially equal to that existing in the convention breakers of radial tires.

As in the prior application, the expression "textile material" has the meaning conventionally attributed to it in the tire industry and comprises, by way of example, organic textile materials, as cotton and rayon; fibers from synthetic polymers, as polyamide fibers, polyester fibers and so on.

The advantage of having folding lines at the lateral edges of the breaker structure is due to the fact that said zones are considerably stiffened, so that it is possible to reduce the width of the additional strip of metallic material, arranged in radially outermost position, without anyhow reducing the rigidity of the base of the tread blocks, which rigidity is essential to reduce the creeping of the tire on the ground and to improve its road holding on wet ground, as described above.

In a preferred embodiment, of the present invention, one of the strips of textile material, preferably that situated in a radially outermost position with respect to the other textile strip, is provided with two foldings, one at each lateral edge of the breaker; the other textile strip is not provided with foldings.

Preferably, one of the folded skirting is directed radially inwardly, and the other radially outwardly.

According to a further embodiment, one textile strip is folded at one edge of the breaker, whilst the other textile strip is folded at the edge opposite to it.

In both cases, the folded textile strips have at least two skirtings of different width; the smaller skirting has a width ranging between 20 and 40 percent of the total width of the breaker, whilst the larger skirting has such a width that, whichever is the arrangement of the textile strips, its value does never exceed the width of the breaker as defined above.

Moreover, in both embodiments, the additional strip of metallic material, arranged in a radially outer position, has preferably a width, ranging between 70 and 90 percent of the width of the breaker as defined above.

It has been surprisingly ascertained that, by limiting the width of the additional strip to the above indicated range of values, the life of the whole structure of the tire is considerably increased.

Probably, this is due to a better distribution of the bending stresses of the breaker structure in its area of contact with the ground.

According to a further preferred embodiment, the strip of metallic material interposed between the textile strips has a width ranging between 100 and 120 percent with respect to the width of the breaker.

The present invention will now be better described with reference to the attached drawings, given by way of example, in which.

Figure 1:
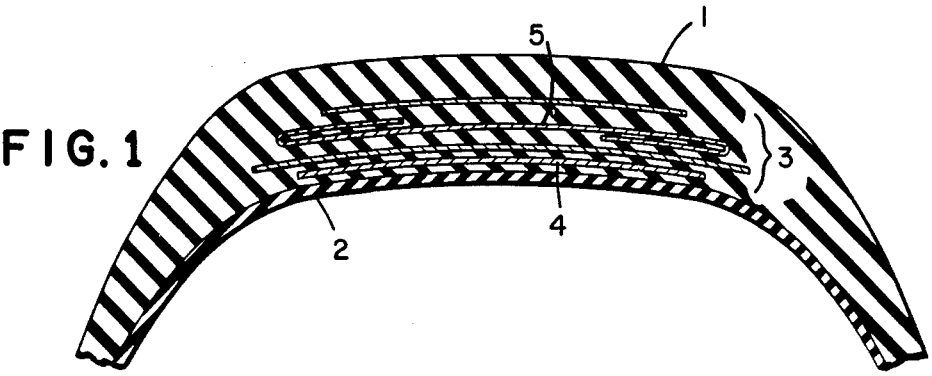
FIGS. 1 and 3 represent diagrammatically the section of two tires according the present invention.
Figure 2:
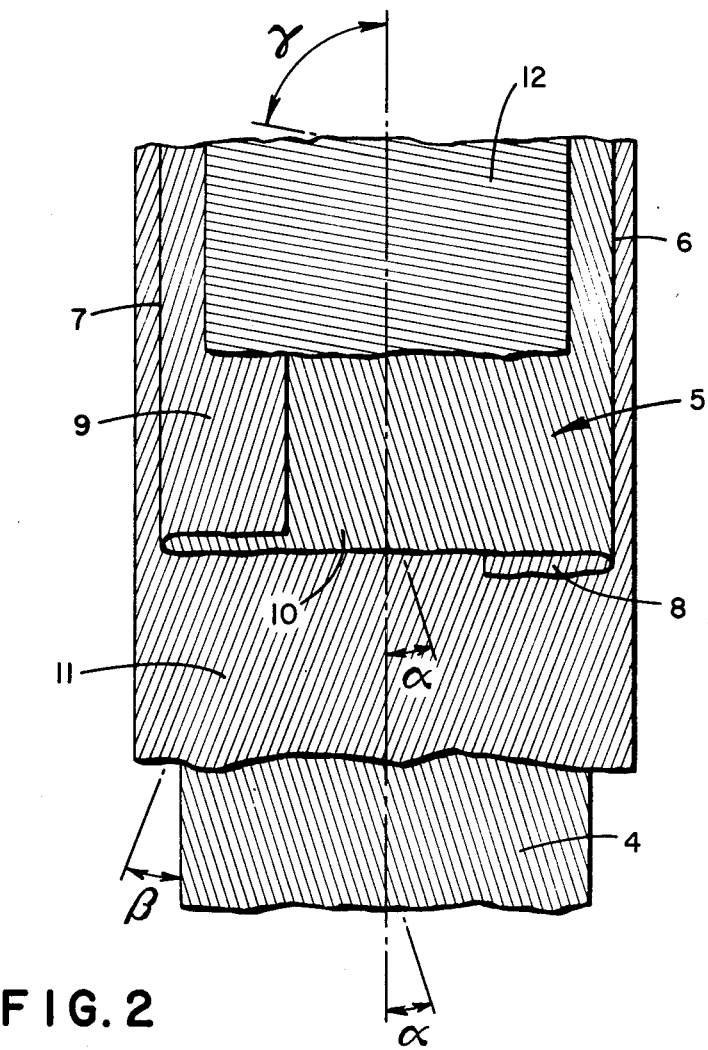
FIGS. 2 and 4 represent in plan view the breaker structures of the tires shown in FIGS. 1 and 3, respectively, with parts broken away to illustrate the path of the cords.

FIGS. 1 and 2 represent an embodiment of the present invention; the tire according to this embodiment comprises a tread 1 and a carcass 2, formed by cords lying in radial planes.

A breaker structure 3, comprising two strips 4 and 5 of textile material, more precisely rayon, is inserted between the tread and the carcass; strip 4 is not folded, whilst strip 5 is folded in such a way as to show two foldings 6 and 7 substantially lying at each lateral edge of the breaker, in order to originate two lateral skirtings 8 and 9.

Whilst skirting 8 is radially turned towards the tire inside, the opposite skirting 9 is turned towards the tread.

The width of the central skirting 10 of strip 5 is substantially equal to the width commonly adopted in the breakers of radial tires; the folded skirtings 8 and 9 have a width equal to 30 percent of that of skirting 10. The width of strip 4 does not substantially differ from that of skirting 10, except for the amount necessary to obtain a normal graduality between the lateral edges of the two textile strips.

The cords of strip 4 and of the central skirting 10 of strip 5 are directed in the same sense and form an angle $\alpha$ of 18° with respect to the mid-circumferential plane of the tire.

A strip 11, formed by metal cords parallel to one another and inclined at an angle $\beta$ of 22° with respect to the mid-circumferential plane of the tire, is interposed between strips 4 and 5.

The inclination of said meal cords is directed in a sense opposite to that of the textile cords of strip 4.

Strip 11 has a width equal to 110 percent of the width of the central skirting 10 of strip 5.

An additional strip 12, formed by metal cords parallel to one another and inclined at an angle $\gamma$ of 80° with respect to the mid-circumferential plane of the tire, is disposed on strips 4, 5 and 11.

The inclination of these metal cords is directed in a sense opposite to that of the textile cords of the larger skirting 10 of the textile strip 5.

The width of the additional strip 12 is equal to 80 percent of the width of the larger skirting 10 of the textile strip 5.

Figure 3:
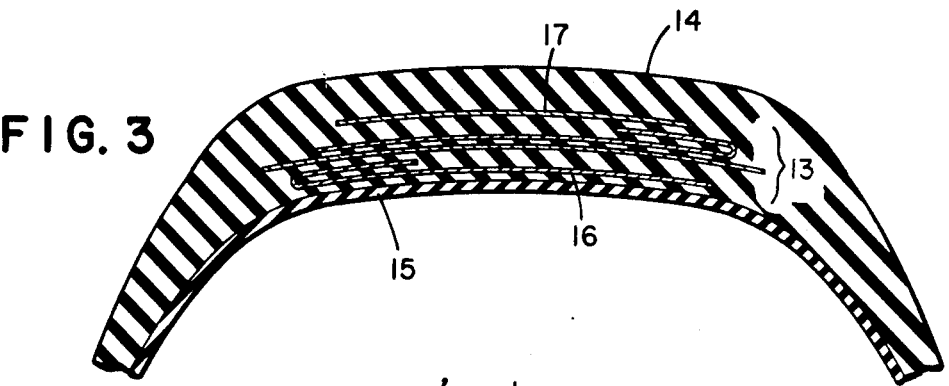
Figure 4:
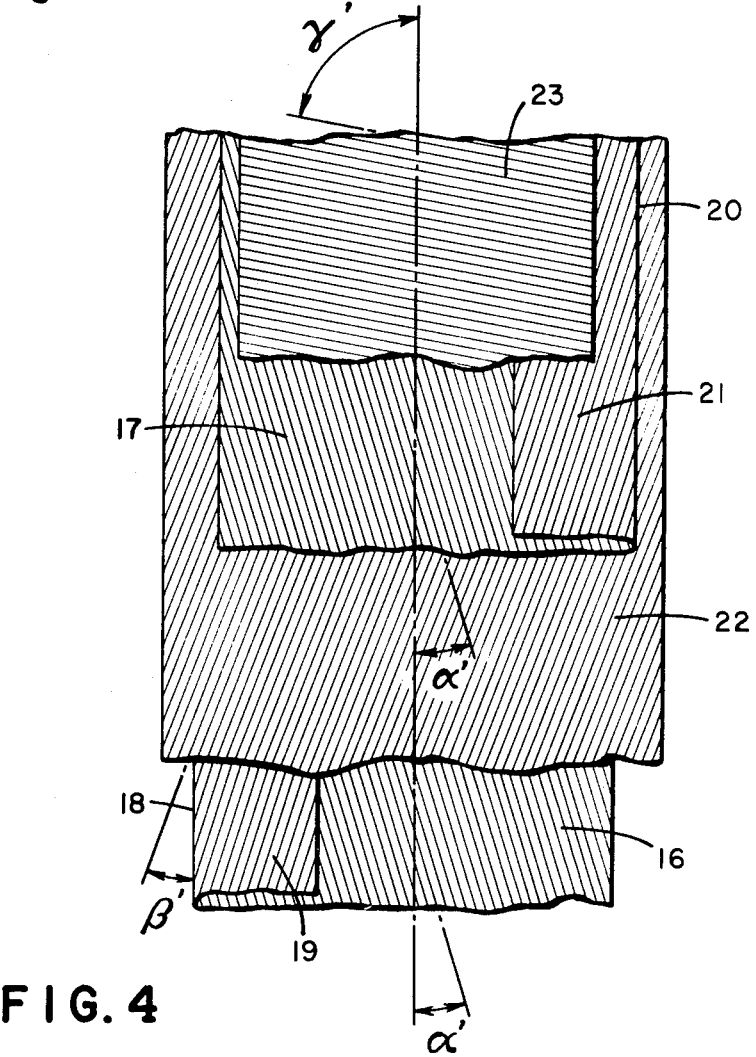

FIGS. 3 and 4 represent a further embodiment of the invention, according to which the breaker 13, interposed between the tread 14 and the carcass 15, comprises two strips 16 and 17 of textile material.

Strip 16 is folded along the folding line 18, lying at one of the lateral edges of the breaker, so as to form a central skirting having a width slightly smaller than the breaker width and a second lateral skirting 19 having a width equal to 30 percent of the breaker width.

Likewise, strip 17 is folded along the folding line 20, at the other lateral edge of the breaker, so as to form a central skirting having a width slightly smaller than the breaker width, and a second lateral skirting 21 having a width equal to 30 percent of the breaker width.

Both skirtings 19 and 21 are radially turned up towards the tread.

The skirtings of larger width of strips 16 and 17 have their textile cords inclined in the same direction, at an angle $\alpha'$ of 18° with respect to the mid-circumferential plane of the tire.

A strip 22, formed by metal cords parallel to one another and inclined at an angle $\beta'$ of 22° with respect to the mid-circumferential plane, is interposed between strips 16 and 17.

The inclination of such metal cords has a direction opposite to those of the textile cords of the larger skirtings of strips 16 and 17.

The strip 22 has a width greater than the distance between the two folding lines 18 and 20 of strips 16 and 17, which distance defines the width of the breaker, and the width of said strip is equal to 110 percent of the breaker width.

An additional strip 23, formed by metal cords parallel to one another and inclined at an angle $\gamma'$ of 80° with respect to the mid-circumferential plane of the tire, is arranged on strips 16, 17 and 21.

The inclination of these metal cords has a direction opposite to that of the textile cords of the larger skirting of the underlying strip 17.

The width of the additional strip 23 is equal to 80 percent of the breaker width.

It is understood that the present invention is not limited to the above reported examples, but that it includes any other alternative embodiments deriving from the above indicated inventive principle.

What is claimed is:

1. A pneumatic tire for vehicle wheels, which comprises a radial carcass and a breaker structure formed by strips of cord fabric of textile material and by strips of cord fabric of metallic material or of another compression-resistant material, the cords of such strips being inclined with respect to the mid-circumferential plane, said breaker structure comprising at least two superimposed strips of textile material whose cords are inclined at an angle ranging between 10° and 30° in one direction with respect to the mid-circumferential plane, at least one strip of metallic material or of another material having a high modulus of elasticity, inserted between said textile strips, whose cords are inclined in an opposite direction at an angle ranging between 13° and 33°, said angle being greater by at least 2° than the angle formed by the cords of said textile strips, an additional strip of metallic material or of another compression-resistant material arranged in a radially outer position, whose cords form with he mid-circumferential plane an angle ranging between 60° and 90°, characterized in that at least one of the strips of textiles material is folded in such a way that at least one folding line is present at each of the lateral edges of the breaker structure.

2. A pneumatic tire as in claim 1, characterized in that one of the strips of textile material has a folding at each lateral edge of the breaker, whilst the other strip of textile material is not folded.

3. A pneumatic tire as in claim 2, characterized in that the folded textile strip is arranged in a radially outermost position with respect to the other textile strip.

4. A pneumatic tire as in claim 2, characterized in that one of the folded skirtings is directed radially inwardly whilst the other is directed radially outwardly.

5. A pneumatic tire as in claim 1, characterized in that one textile strip is folded at one edge of the breaker, whilst the other textile strip is folded at the opposite edge.

6. A pneumatic tire as in claim 1, characterized in that the folded textile strips have at least two skirtings of different width, the smaller skirting having a width ranging between 20 and 40 percent with respect to the breaker width, and the larger skirting having a width such that, whichever is the arrangement of the textile strips, its value is never higher than the breaker width.

7. A pneumatic tire as in claim 1, characterized in that the additional strip of metallic material, arranged in radially outer position, has a width ranging between 70 and 90 percent with respect to the breaker width.

8. A pneumatic tire as in claim 1 characterized in that the strip of metallic material interposed between the textile strips has a width ranging between 100 and 120 percent with respect to the breaker width.

* * * * *

UNITED STATES PATENT OFFICE
CERTIFICATE OF CORRECTION

Patent No. 3,690,364            Dated September 12, 1972

Inventor(s) Carlo BARASSI et al

It is certified that error appears in the above-identified patent and that said Letters Patent are hereby corrected as shown below:

Please correct the following errors:

Column 1, line 12, cancel "according" (second occurrence);
          line 38, change "positions" to --position--;
Column 2, line 3, change "trips" to --strips--;
          line 22, change "convention" to --conventional--;
          line 39, cancel the comma (,) after "embodiment";
Column 4, line 58 change "he" to --the--;
          line 60; change "textiles" to --textile--.

Signed and sealed this 6th day of March 1973.

(SEAL)
Attest:

EDWARD M. FLETCHER, JR.
Attesting Officer

ROBERT GOTTSCHALK
Commissioner of Patents